(12) United States Patent
Andaloro et al.

(10) Patent No.: US 11,140,873 B2
(45) Date of Patent: Oct. 12, 2021

(54) MULTI-GRIP ANIMAL LEASH HANDLE AND SYSTEM AND METHOD OF MAKING THE SAME

(71) Applicants: Gina M Andaloro, Collegeville, PA (US); Anthony F DiCastelnuovo, Collegeville, PA (US)

(72) Inventors: Gina M Andaloro, Collegeville, PA (US); Anthony F DiCastelnuovo, Collegeville, PA (US)

( * ) Notice: Subject to any disclaimer, the term of this patent is extended or adjusted under 35 U.S.C. 154(b) by 254 days.

(21) Appl. No.: 16/356,416

(22) Filed: Mar. 18, 2019

(65) Prior Publication Data

US 2020/0296933 A1 Sep. 24, 2020

(51) Int. Cl.
*A01K 27/00* (2006.01)

(52) U.S. Cl.
CPC .......... *A01K 27/003* (2013.01); *A01K 27/005* (2013.01); *A01K 27/006* (2013.01)

(58) Field of Classification Search
CPC .. A01K 27/003; A01K 27/005; A01K 27/006; A01K 27/008; A01K 27/00; B25G 1/01
See application file for complete search history.

(56) References Cited

U.S. PATENT DOCUMENTS

| | | | | |
|---|---|---|---|---|
| 5,129,363 A * | 7/1992 | Ricketts | ............... | A01K 27/004 119/799 |
| 5,453,032 A * | 9/1995 | Crowe | ................... | B63B 34/63 441/69 |
| 5,724,921 A * | 3/1998 | Bell | ........................ | A01K 27/00 119/795 |
| 5,732,662 A * | 3/1998 | Jacobsen | ............... | A01K 27/003 119/798 |
| 5,762,029 A * | 6/1998 | DuBois | ................ | A01K 27/004 119/796 |
| 5,803,017 A * | 9/1998 | Stewart | ................ | A01K 27/003 119/799 |
| 6,142,547 A * | 11/2000 | Bowerman | .......... | A01K 1/0236 224/921 |
| 6,460,488 B1 * | 10/2002 | Manzella | ............. | A01K 27/003 119/712 |
| 6,477,922 B1 * | 11/2002 | Burnett | .................... | B25D 1/00 81/20 |
| 6,827,045 B1 * | 12/2004 | Willner | ................ | A01K 27/003 119/795 |

(Continued)

*Primary Examiner* — Joshua D Huson
*Assistant Examiner* — Megan J Moroney
(74) *Attorney, Agent, or Firm* — Jayne Saydah

(57) ABSTRACT

A multi-grip handle apparatus for an animal leash or harness includes a tubular handle body having a first end with a first opening and a second end with a second opening. An annular handle body surface extends between the first end and second end and a central bore extends between the first and second openings. A first cord extends from the first opening, and a second cord extends from the second opening. The first and second cord are secured by a clasp which secures a third cord. The third cord is configured to connect to at least one animal leash, animal collar or animal harness. The handle body surface includes a first grip section laterally adjacent and spaced apart from a second grip section. The central bore contains a filler that prevents the first and second cords from contacting the first and second openings, respectively.

16 Claims, 10 Drawing Sheets

(56) References Cited

U.S. PATENT DOCUMENTS

| | | | | |
|---|---|---|---|---|
| 8,104,145 B1* | 1/2012 | Hajianpour | ............... | B25G 1/08 |
| | | | | 16/428 |
| 8,955,465 B1* | 2/2015 | VanDommelen | .... | A01K 27/003 |
| | | | | 119/795 |
| 9,010,279 B1* | 4/2015 | Saber | ................... | A01K 27/003 |
| | | | | 119/795 |
| 9,107,391 B1* | 8/2015 | McGuire | ................. | A01K 27/00 |
| 9,271,475 B2* | 3/2016 | Shaver | ................. | A01K 27/005 |
| 2001/0048230 A1* | 12/2001 | Cornelius | ............. | A01M 31/00 |
| | | | | 294/153 |
| 2007/0039562 A1* | 2/2007 | Carter | ................. | A01K 27/005 |
| | | | | 119/798 |
| 2010/0227747 A1* | 9/2010 | Cook | ................ | A63B 21/0724 |
| | | | | 482/112 |
| 2010/0319631 A1* | 12/2010 | Rane | ................... | A01K 27/003 |
| | | | | 119/792 |
| 2011/0232031 A1* | 9/2011 | Salais | ................. | A01K 27/006 |
| | | | | 16/111.1 |
| 2012/0186538 A1* | 7/2012 | Newton | .............. | A01K 27/003 |
| | | | | 119/795 |
| 2013/0192539 A1* | 8/2013 | Woodruff | ............. | A01K 27/005 |
| | | | | 119/798 |

\* cited by examiner

MULTI-GRIP ANIMAL LEASH HANDLE AND SYSTEM AND METHOD OF MAKING THE SAME

BACKGROUND OF THE INVENTION

The present invention relates to a dual or multi-grip animal leash handle and/or a dual or multi-grip leash handle system that may be attached to a separate animal leash or multiple animal leashes, and the method of making the same. More particularly, the multi-grip handle permits an animal walker or handler, such as a dog walker, to place two hands, laterally adjacent to each other, on a single leash handle.

Conventional leashes and leash handles employ single grip handles for use with only one hand. The use of the single grip handle has disadvantages. For example. the entire force caused by a dog pulling on the leash is transmitted to one hand and arm and eventually a person's neck and back. This force may cause many different types of injuries such as repetitive strain, neck, arm, and back injuries. Additionally, the single grip permits only the strength of one arm or hand to be used to control and animal attached to the leash.

BRIEF SUMMARY OF THE INVENTION

It is the object of this invention to reduce or eliminate negative ergonomic and other possible user injuries associated with walking or controlling an animal (i.e. dog) using the conventional single-handed grip. The dual handled grip permits a user to hold the handle with both hands positioned laterally adjacent to each other. The combination of dual hand positions and the structure of the handle provides a more ergonomic handle than that of the conventional art. The strength of both hands and arms may be used to control the animal harnessed to the leash. Also, the force of the animal pulling is dispersed between both hands and arms rather than one hand.

One aspect of the invention is a handle apparatus for an animal leash or harness. The handle apparatus comprises a tubular handle body including a first end with a first opening and a second end with a second opening, a substantially annular handle body surface extending between the first end and second end, and a central bore extending between the first and second openings and defined by the handle body surface; a first cord including a first portion extending from the first opening in first end of the handle body; a second cord including a second portion extending from the second opening in the second end of the handle body; a clasp connecting the first portion of the first cord and the second portion of the second cord; a third cord having a first end connected to the clasp, the third cord having a second end extending away from the clasp; a connector attached to the second end of the third cord, the connector configured to connect to at least one animal leash, animal collar or animal harness; a first grip section on the handle body surface, the first grip section adjacent the first end of the handle body; and a second grip section on the handle body surface, the second grip section adjacent the second end of the handle body and the second grip section laterally adjacent the first grip section.

The first cord of the handle apparatus may also comprise a third portion extending from the first opening into the central bore and towards the second opening in the handle body. Additionally, the second cord may also comprise a fourth portion extending from the second opening into the central bore and towards the first opening in the handle body.

Also, the central bore contains a filler surrounding both the third portion of the first cord and the fourth portion of the second cord such that the filler prevents the first cord from contacting the handle body at the first opening and the filler prevents the second cord from contacting the handle body at the second opening. The filler may comprise a polyurethane expansion glue, an expansion glue, polyurethane glue, foam and/or spray foam.

The handle apparatus may also include the first portion of the first cord having a first length of cord extending from the first opening to the clasp, and the second portion of the second cord having a second length of cord extending from the second opening to the clasp. Also, the first length of cord may be substantially equivalent to the second length of cord.

The handle apparatus may also include a third grip section on the handle body surface, and the third grip section may be located laterally adjacent to and between the first and second grip sections.

The handle apparatus has a handle body formed of a substantially non-flexible material such as one of a metal, plastic, polymer, wood or ceramic.

The handle apparatus may also include the first grip section and the second grip section each including at least one ridge and one groove formed in the handle body surface.

The handle apparatus may also comprise a first grip overlying the first grip section of the handle body surface, and a second grip overlying the second grip section of the handle body surface. Also, the first and second grips are each configured to accommodate a users' hand.

In another embodiment, the handle apparatus may further comprise an internal cord portion extending in the central bore from the first opening in the handle body to the second opening in the handle body, and the internal cord portion connecting the first portion of the first cord to the second portion of the second cord. Also, there may be a filler in the central bore, and the filler surrounds the internal cord portion such that the filler prevents the first cord and internal cord from contacting the handle body at the first opening and the filler prevents the second cord and internal cord from contacting the handle body at the second opening.

In another embodiment, the handle apparatus further comprises at least one light device connected to the handle body such that the light contacts the handle body surface and the light device is configured to illuminate an area in front of the handle body and in a direction of an animal connected to the handle body.

In another embodiment, the handle apparatus further comprises an elongated opening in the handle body surface with the elongated opening located between the first grip section and the second grip section, and the elongated opening provides access to a portion of the central bore directly under the elongated opening. Also, at least one bag may be in the central bore directly under the elongated opening and the at least one bag is capable of being removed from the central bore via the elongated opening.

Another aspect of the invention includes a method of making a multi-grip animal leash handle. The method comprises the steps of forming a tubular handle body including an annular surface extending between a first end with a first opening and a second end with a second opening, and the handle body has a central bore extending from the first opening to the second opening; providing at least one cord cable of being inserted into the handle body and having a length so that the cord may form a substantially isosceles triangle with the handle body as the base; threading the at least one cord through the first opening of the handle body, into the central bore and out the second opening of the handle body; arranging the cord with a first length of cord extending from the first opening and a second length of cord extending from the second opening such that the first and second lengths of cord having substantially equal lengths; inserting a filler into the central bore and surrounding the cord in the central bore with the filler such that the cord cannot contact the handle body surface at the first and second openings; forming first and second grips on the handle body by placing a grip material adjacent the first and second ends of the handle body; securing the first and second lengths of cord in one end of a clasp so the first and second lengths of cord form the sides of substantially isosceles triangle with the handle body forming the base; securing a first end of a second cord in a second end of the clasp, the second end of the clasp opposite the first end of the clasp, such that second cord extends away from the first and second lengths of cord; and securing a second end of the second cord to one of an animal collar, animal harness or connector capable of attaching to an animal collar or animal harness.

The method may further comprise the step of attaching a light device in a position on the handle body so that the light device is configured to illuminate in the direction of the clasp.

The method may also further comprise the step of creating a third opening extending through the handle body surface to the central bore and the third opening being located between the first grip and the second grip. Also, the method may include inserting at least one bag into the third opening.

Additionally, the method may include the step of forming the tubular handle body that further comprises forming a first ridge and a first groove adjacent the first end of the handle body and forming second ridge and a second groove adjacent the second end of the handle body, the second groove and second ridge laterally spaced apart from the first ridge and first groove.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. The words "lateral" and "laterally" refer to positioning which moves along the centerline. Also, as used herein, the words "connected" or "coupled" are each intended to include integrally formed members, direct connections between two distinct members without any other members interposed therebetween and indirect connections between members in which one or more other members are interposed therebetween.

Figure 1A:
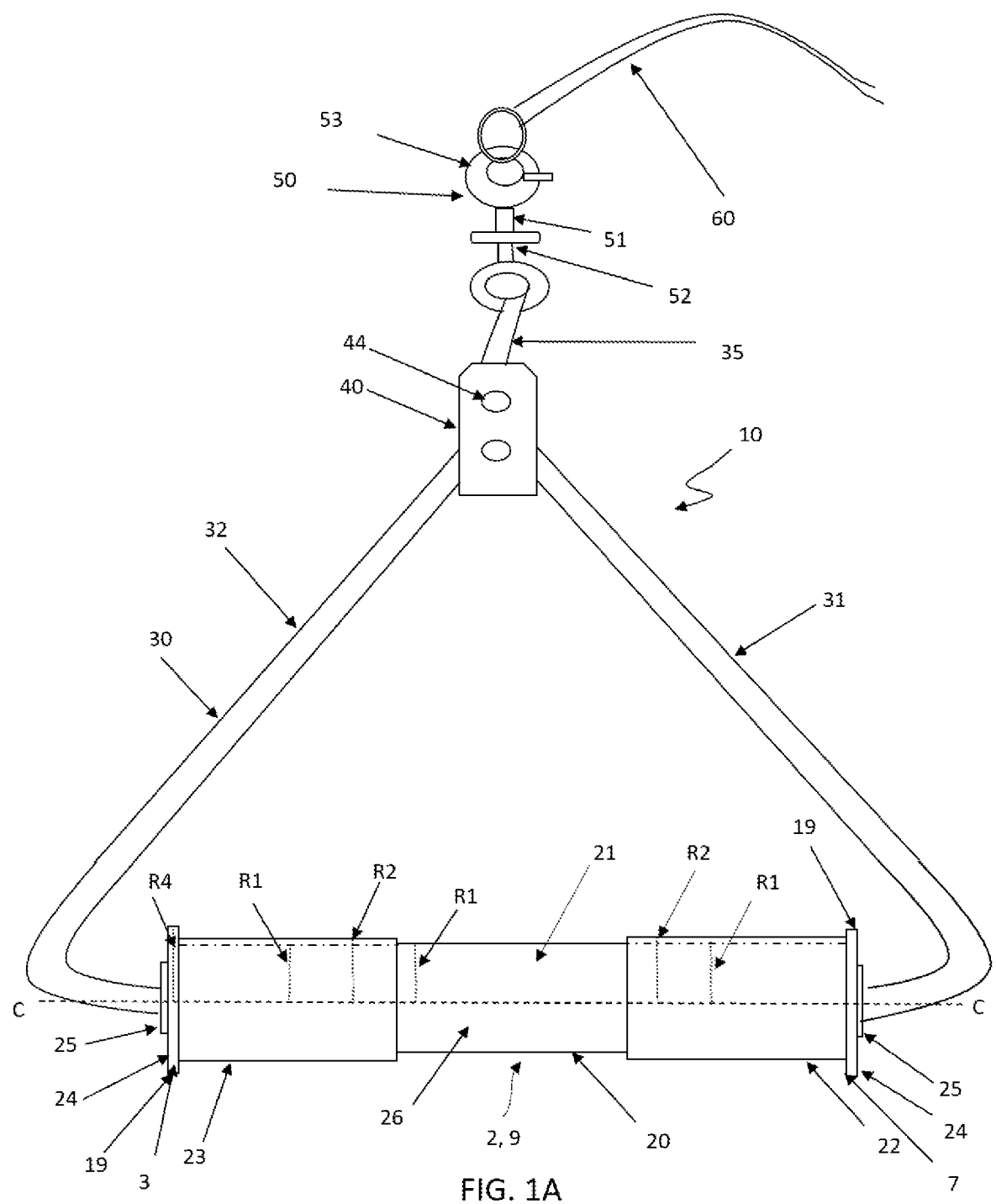
FIG. 1A is a top plan view of a preferred embodiment of the leash handle system with leash attachment.

Referring now to the drawings in detail, wherein like numbers are used to indicate like elements throughout, there is shown in FIGS. 1A-1E, a preferred embodiment of leash handle system 10 which may be attached to a leash that is used to walk or control different types of animals such as a dog, goat or sheep, etc. As shown in FIG. 1A, the handle system 10 basically comprises a handle body 20, two grips 22, 23 on the handle body 20, a single hand grip 26 and/or waste bag 87 feature area between the two grips 22, 23, a cord 30 connecting the handle body to a clasp 40, and a leash connector 50 connected to the clasp 40 via cord 35 and capable of connecting the handle system 10 to a leash 60.

As shown in FIGS. 1A, 1B, 1D and 1E, the handle body 20 is a hollow tube, substantially hollow cylinder and/or a substantially annular hollow tube. The handle body 20 has a central bore hollow center 28 (FIG. 1E), outer surface 21, inner surface 27, a centerline C, ends 3, 7 and opening 1 in end 3 and opening 6 in end 7. The outer and inner surfaces 21, 27 are substantially annular and define or surround the central bore 28. The radius to the inner surface 27 from the centerline C is R3 and the radius from the center line C to the outer surface 21 is R1. The length of the handle body 20 in the preferred embodiment is about 11 inches, but the length may be increased or decreased on factors such as the size of the user, ergonomic requirements of the user and/or handle features which may include those discussed below.

Cord 30 has cord sections 31 and 32 extending from the handle body 20 to the clasp 40 in which they are secured. Cord sections 31, 32 are of substantially equal length forming sides of a substantially isosceles triangle with the handle body 20 as the base. In the case that the handle body 20 is 11 inches long, the preferred length of cord sections 31, 32 is substantially 8 inches long. It is foreseeable, that the length of cord sections 31, 32 may change when the length of the handle body 20 varies.

Clamp 40 is a type of rope clamp or rope splice clamp that is capable of securing three sections of cord 31, 32 and 35. Also, it connects the handle body 20 to a leash 60 via connector 50. Clamp 40 provides stability to the handle system 10 by helping to reduce twisting of cord sections 31, 32 and securing equal lengths of cords 31 and 32 so the force of the leashed animal may be distributed across the length of handle body 20. The shape of the clamp 40, and its relative dimensions assist in providing the beneficial stability. For example, the clamp 40 is substantially longer than wide, and has the relatively longer dimension substantially perpendicular to the handle body 20. Also, clamp 40 has an upper and lower half and secures the ends of cord sections 31, 32 between the two halves with internal teeth. This clamp 40 is the preferred type of connection, but it is foreseeable that other clamps, knots and rope splicing may also be suitable. In the preferred embodiment, clamp 40 is made of a relatively hard thermoplastic, but it may also be made other materials such as metal and metal alloys.

The annular or cylindrical shape of handle body 20 is the preferred embodiment, but it is foreseeable that other shapes, such as cuboid and hexagonal or triangular prism, may also be used. The handle body 20 is made of a relatively strong, stiff material with sufficient strength to withstand the force of the animal for which it will be used. In other words, when subjected to the force of a leashed animal, the handle body is made of a material that is strong enough so as to not bend, twist, or otherwise substantially deform. Also, it is preferable that the handle body 20 be formed of a material that is relatively light weight so as to allow the user to easily hold and control it. Some examples of a suitable materials include PVC, hard rubber, polymers, plastics, thermoplastic and metals such as aluminum, steel and/or other metal alloys.

In the preferred embodiment, grips 22, 23 are connected to and/or in direct contact with the outer surface 21 of the handle body 20. The grips 22, 23 are positioned so each grip 22, 23 is adjacent respective ends 3 and 7 of handle body 20. Also, grips 22, 23 are laterally or axially spaced apart from each other so as to leave a portion 2 of the outer surface 21 not covered by a grip 22, 23. The grips 22, 23 have a width that is wide enough to accommodate a person's hands and may be increased or decreased in length based on the size of a user's hands. Also, the grips 22, 23 may be large enough to cover the entire circumference of the handle body 20 or a portion of the circumference of the handle body 20.

The portion 2 of the outer surface 21 of the handle body that is not covered by grips 22, 23 may form a handle area 9 on the handle body 20. Handle area 9 is centrally located on the handle body 20 and may be used as a single hand grip 26 for a user to hold the leash handle with one hand. Gripping the handle body 20 with one hand on the single hand grip 26 allows the user to hold the handle body 20 and still receive ergonomic benefits from the leash handle system 10. Optionally, a grip material may be placed over the single hand grip 26.

In the preferred embodiment, grips 22, 23 serve the dual purpose of providing the user with a secure method of holding the leash handle and absorbing stress caused by the animal on the other end of the leash. The grips 22, 23, as well as, any grip material added for the single hand grip 26, may be made of a relatively firm rubber material, as in the preferred embodiment. Additionally, the grips may be made be made of other suitable materials such as a relatively soft rubber (natural or synthetic), foam, silicon rubber, plastics, silicon with gel under the grip and leather. Also, the grips may have surface characteristics to assist a user's hands in gripping the handle body 20. For example, grips 22, 23 and 26 may be sticky or texturized. The grips 22, 23 may be secured to the handle body 20 using a friction fit or adhesive such as glue or epoxy resin.

A collar 24 may be formed integral with grips 22, 23, as in the preferred embodiment, or it may be a separate piece that is connected to each end 3, 7 of the handle body 20 and/or grips 22, 23. The collar 24 extends radially outwardly from the grip and centerline C and has a radius R4 between the centerline C and outer surface 19 of the collar 24. The radius R4 is relatively greater than the radius R2, which extends from the centerline C to the outer surface of grips 22, 23. Collar 24 serves the dual purpose of supporting a user's hand (i.e. by preventing slipping) and preventing cord 31, 32 from encroaching on grips 22, 23 and decreasing the grip space available or injuring the user's hands or fingers. The radius R4 of the collar 24 is at least great enough to ensure cords 31, 32 do not encroach on the grips 22, 23. In the preferred embodiment, the grips 22, 23 are made of a relatively hard rubber and the collar 24 is formed of the same material as the grips 22, 23. However, it is foreseeable that collar 24 and grips 22, 23 may be made of materials having different strengths. For example, if the grips 22, 23 are made from a relatively soft material such as a soft silicon rubber or foam, the collar 24 may be made of a material such as plastic or hard rubber that is strong enough to prevent the cords 31, 32 from encroaching on the grip area.

Figure 1B:
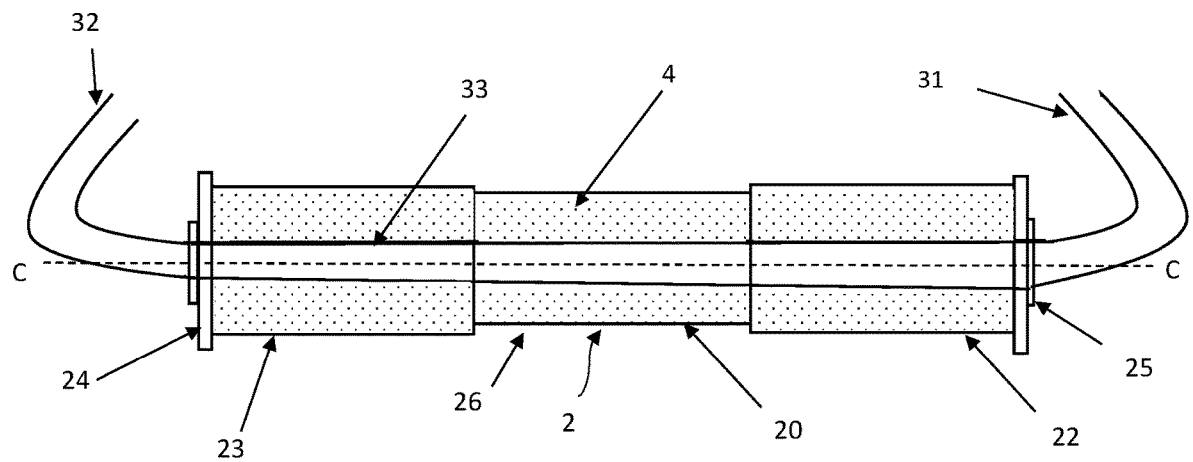
FIG. 1B is a top plan view of the embodiment in FIG. 1A and depicts an embodiment the inside of the handle body of FIG. 1A.

FIG. 1B shows a cross section of the embodiment of the handle system of FIG. 1A. Cord 30 secures the handle body 20 to leash 60 via clasp 40 and connector 50. As shown, cord 30 runs through the center of handle body 20 which creates three sections 31, 32, 33 in cord 30. Section 33 of cord 30 is located inside the central bore 28 of handle body 20 and sections 31 and 32 extend out from the handle body 20 and are each secured by clasp 40. As shown in FIG. 1A and discussed above, sections 31, 32 of cord 30 are of substantially equal length and in the preferred embodiment, and the length of cord sections 31, 32 is substantially 8 inches. In the preferred embodiment, the length of cords 31, 32, handle body 20 and the use of clasp 40 results in a stable handle system 10. In other words, this arrangement allows substantially equal distribution of forces generated by the leashed animal to the handle body 20. Therefore, the forces transmitted to the user are substantially equal in both hands and arms, rather than only being absorbed by one hand using a leash with a single grip. Also, the user may use the strength of both hands to control the leashed animal rather than one hand.

Figure 1C:
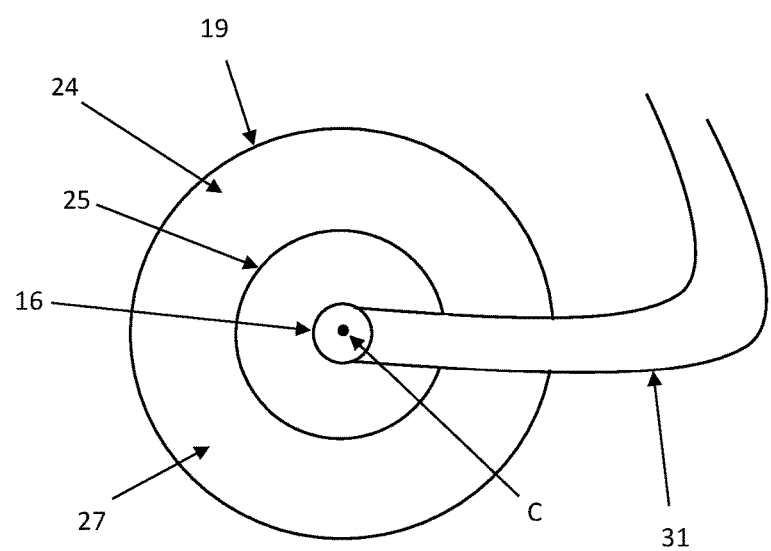
FIG. 1C is a sideview of an end of the handle body of FIG. 1A.

FIG. 1C is a side view of one end of the handle body 20, but it is representative of both ends 3, 7 of the handle body 20. Cord 30 is secured to the handle body 20 by threading cord 30 from opening 16 on one end of the handle body 20 to opening 16 on the other end of handle body 20. Just prior to entering the opening 16, a washer 25 may be placed on the outside of the grips 22, 23 and their respective collars 24. Washer 25 is designed to help protect the structural integrity of the cord 30, collars 24 and openings 16. Washer 25 maybe made of a suitably hard material such as hard plastic, rubber, metal or a metal alloy.

Figure 1D:
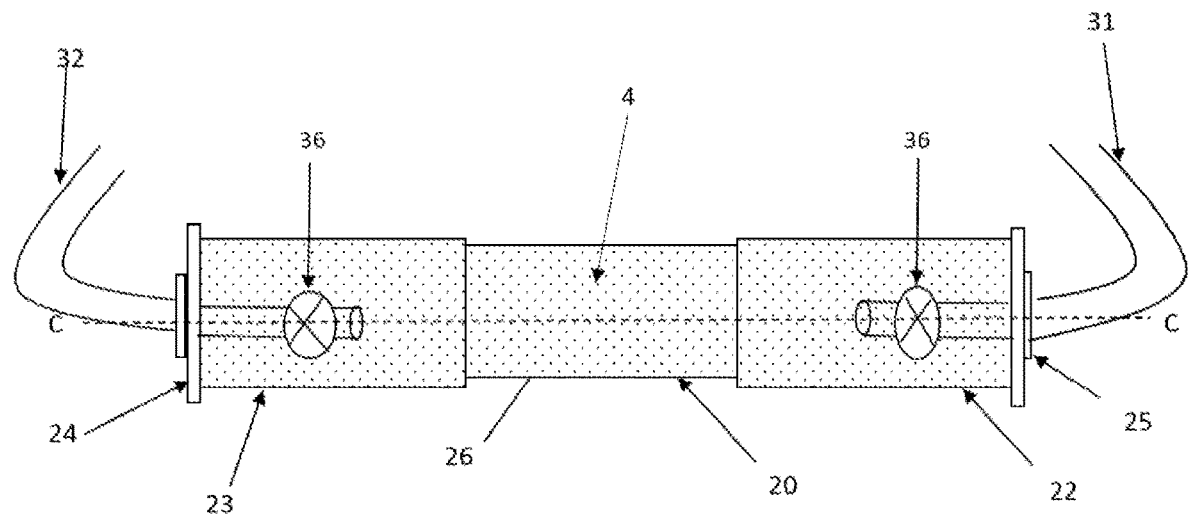
FIG. 1D is a top plan view of the embodiment of FIG. 1A and depicts a second embodiment of the inside of the handle body.
Figure 1E:
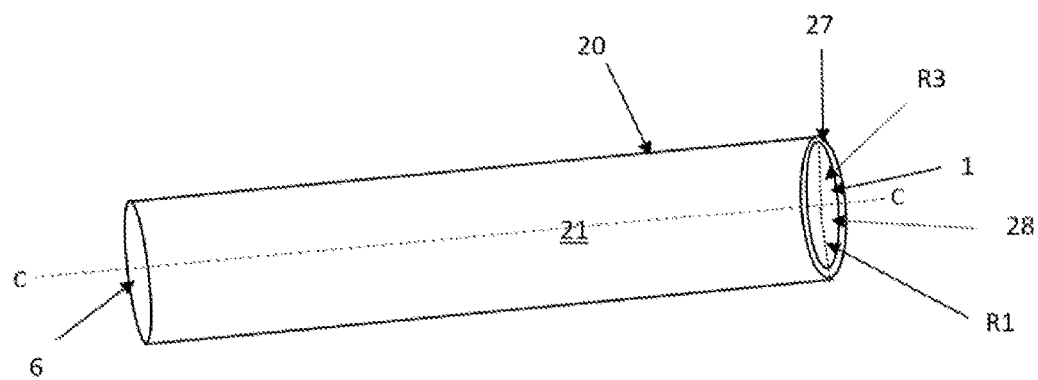
FIG. 1E depicts the handle body of the embodiment in FIG. 1A.

As shown in FIG. 1D, rather than use one piece of cord 30 with a single length 33 inside handle body 20, two lengths of cord 31 and 32 may be used. Each piece of cord 31, 32 may be secured to the handle body 20 with a knot or clamp 36 on the ends of cord 31, 32 inside the handle body 20. The diameter of the knots or clamps 16 should be greater than the diameter of the opening 16.

In the preferred embodiment, a filler 4, such as polyurethane expansion glue, foam or spray foam, is injected into the handle body 20. As shown in FIGS. 1B and 1D, the filler 4 is used to maintain the cord section 33 and the two lengths of cord 31 and 32 in a substantially central position inside the handle body 20. For example, it is preferable that cord section 33 is substantially parallel to the centerline C of the handle body 20. The same is true for the lengths of cord sections 31 and 32 that extend inward from the handle body 20 ends 3,7 to the respective knots or clamps 36 that are inside handle body.

Figure 2A:
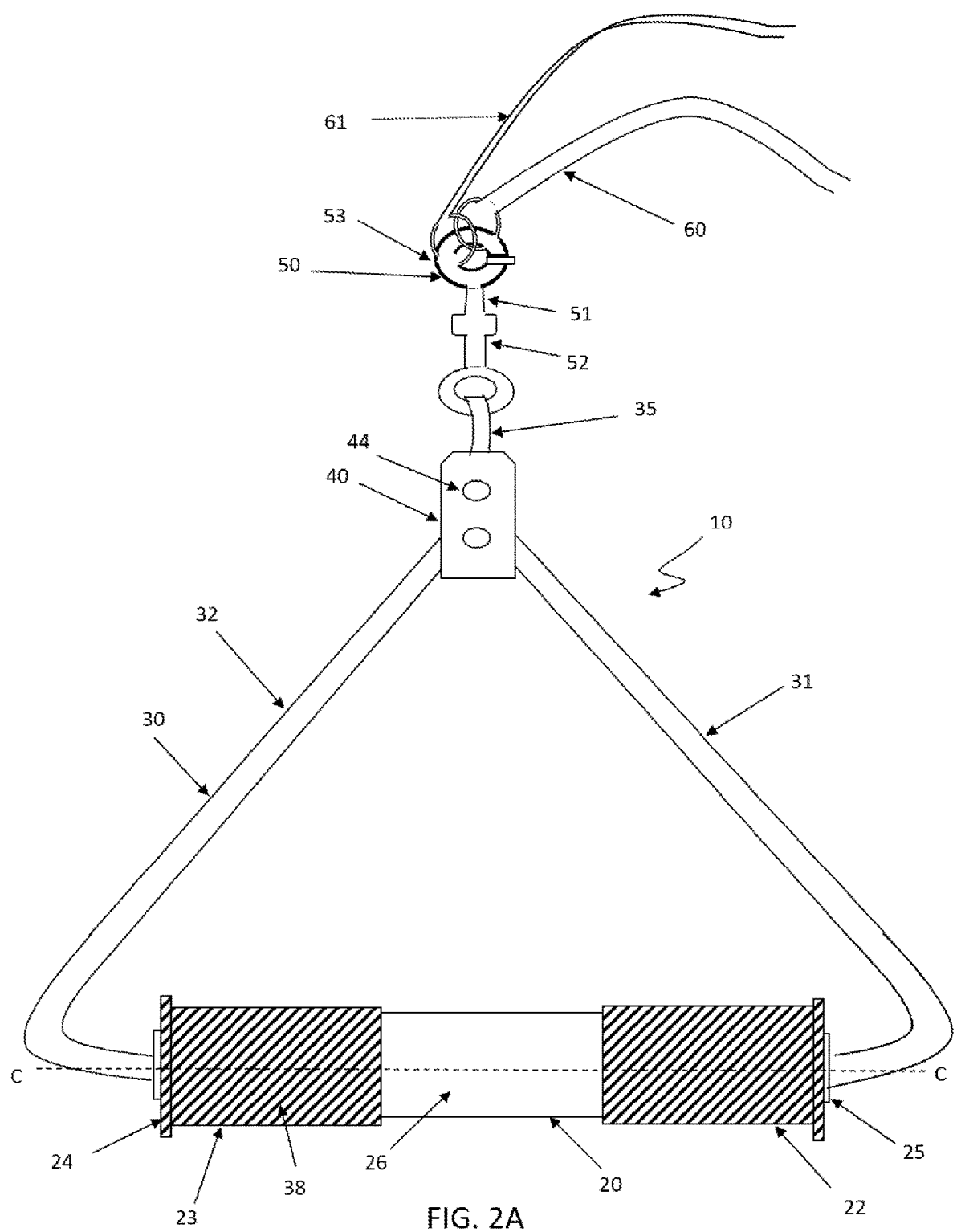
FIG. 2A is a top plan view of a second embodiment of leash handle system depicted in FIG. 1A.

As shown in FIGS. 1A and 2A, a section of cord 35 may be directly connected to clasp 40 and connector 50 which connects with leash 60. The length of leash section 35 may vary based on the size and type of the animal to be walked or the size of the person. For the average dog walker, the second cord 35 may be constructed in 4, 6 and 8 ft. length.

The connector 50 is preferably a swivel type connector 50 with a base 51 and a section 52 fixed to an annular loop 53. The swivel section 52 is capable of rotating with respect to base 51. Loop 53 has an opening, which can be opened manually, for attaching leash 60 or multiple leashes. The use of the swivel connector helps to reduce forces such as torque caused by the leashed animal moving from side to side. As a result, it is the preferred type of connector, but it is foreseeable that other types of connectors 50 may be used such as a carabiner.

As shown in FIG. 1A, one leash 60 is inserted into the annular loop 53 of connector 50. However, as shown in FIG. 2A, it is possible to attach multiple leashes 60, 61 to the connector 50. For illustration purposes, FIG. 2A only shows 2 leashes 60, 61, but this number may be expanded to many more leashes. The structural stability, dispersal of forces and dual hand grip assist the person holding the handle with two hands to more comfortably and easily walk multiple animals such as dogs with ease. The handle system 10 stability also assists a person holding the leash with one hand in the single grip 26 position to walk multiple dogs at once with more ease.

In the preferred embodiment, cord 30 and 35, clasp 40 and connector 50 are each rated to be effective at forces of 100 lbs. and greater. The strength of these components may be increased or decreased based on the strength of the animal to be used with the handle system 10. For example, if the handle system 10 is to be used with relatively large animal such as a horse, a relatively stronger cord 30, clasp 40 and/or connector 50 may be desired. Also, cords 30 and 35 may be made various flexible materials such as a rope, nylon, rope threaded with a reflective material, metal wire, cord and leather. Cord 30 could also be made of a non-flexible material of suitable strength such as metal.

Figure 2B:
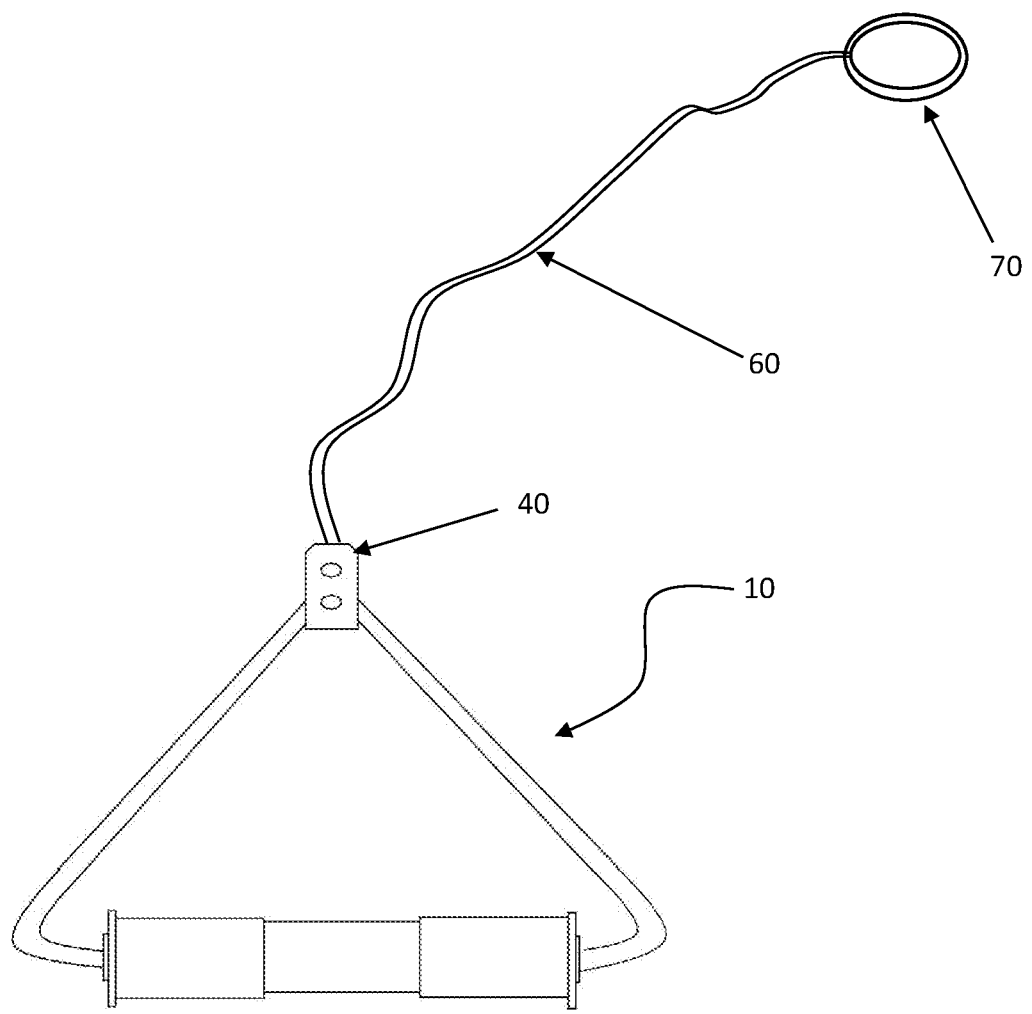
FIG. 2B is a top plan view of another embodiment of leash handle system depicted in FIG. 1A.

FIG. 2B depicts an alternate embodiment. As shown in FIG. 2B, connector 50 may be connected to leash 60, which may be connected directly to an animal collar or harness 70. It is noted that number 70 is used to denote either a collar or harness 70 for attachment of the leash to the animal. Also, it is preferable to use a harness 70 when operating the leash with two hands.

Figure 3A:
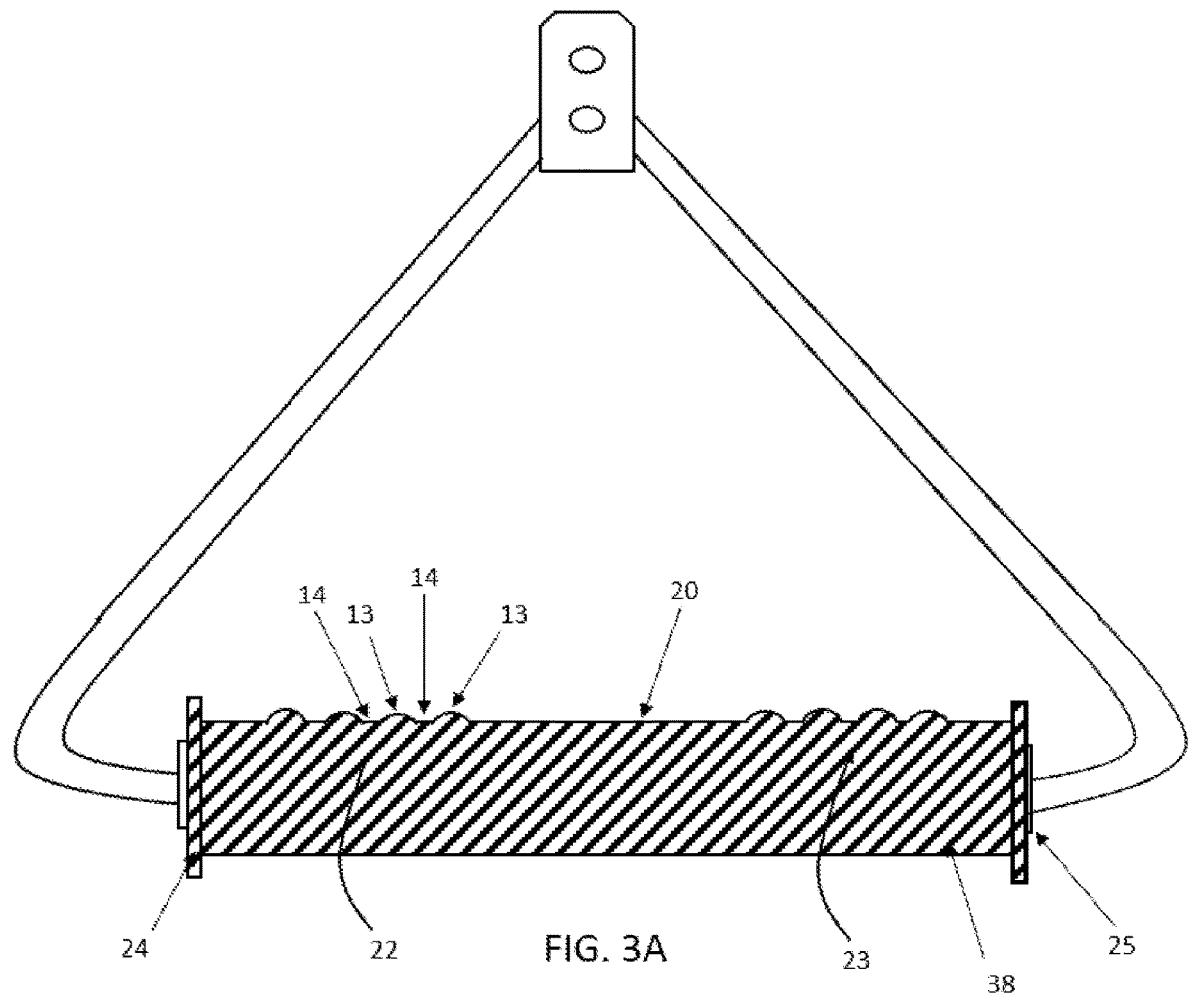
FIG. 3A is a top plan view of an alternate handle body for the leash handle system depicted in FIGS. 1A, 2A and 2B.

FIG. 3A depicts an alternate embodiment of handle body 20 in which grips 22, 23 and collar 24 may be formed in the handle body surface 21. In this case, grips 22, 23 may be formed of ridges 13 and grooves 14 surrounding the entire handle body surface 21 or a portion of the handle body surface 21. The number of ridges and grooves may be more or less than shown. In this embodiment, each grip 22, 23 is configured to accommodate a hand and four fingers so grips 22, 23 each have four ridges 13 alternating with four grooves 14. Although not shown, the single hand grip may be accommodated by forming ridges and grooves between those formed for grips 22, 23. The handle body 20, as shown in FIG. 3A, may be made by a molding process, injection molding process and/or 3D printing, etc. and formed of a hard rubber or plastic, metal or metal alloy.

A grip layer 38 (shown by the area shaded with lines) may cover the entire handle body surface 21, as shown in FIG. 3A or a portion of surface 21 as shown in FIG. 2A. The grip layer 38 may be formed of materials capable of enhancing a person's ability to grip the handle body 20 and/or absorb shock or forces imparted to the handle body 20 by a leashed animal. Some examples of the material may be rubber (natural or synthetic), soft plastic, hard plastic, neoprene, or other material may be applied to the surface 21, whether textured or not, in the area of grips 22, 23 or over the entire the entire surface 21.

A collar 24 may be located on each end 3, 7 of the handle body 20, and in this embodiment, it is also formed into the handle body 20. It is also foreseeable that collar 24 may not be formed into the handle body 20 and may be added as a separate item and connected to the handle body 21.

Figure 3B:
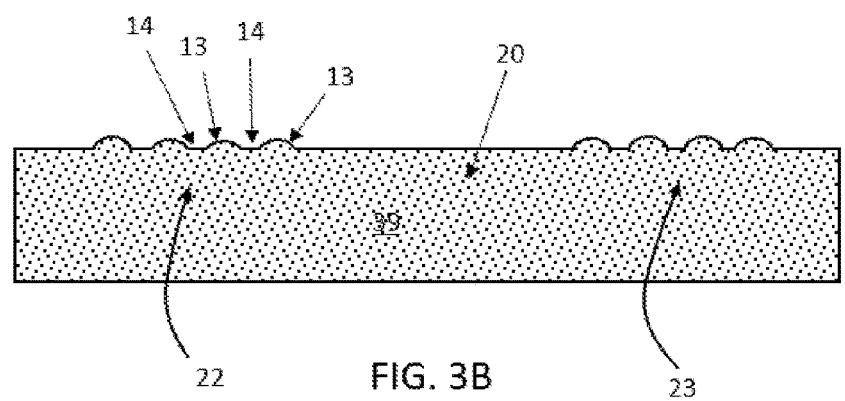
FIG. 3B is a top plan view of the handle body of FIG. 3A.

As shown in FIG. 3B, a texture pattern 39 may be formed into surface 21 during the molding process or after molding, by mechanical methods such as engraving or sanding. It is foreseeable that the texture pattern 39 could also be formed into grip layer 38 and/or grip layer 38 may be formed over the texture pattern 39.

Figure 4A:
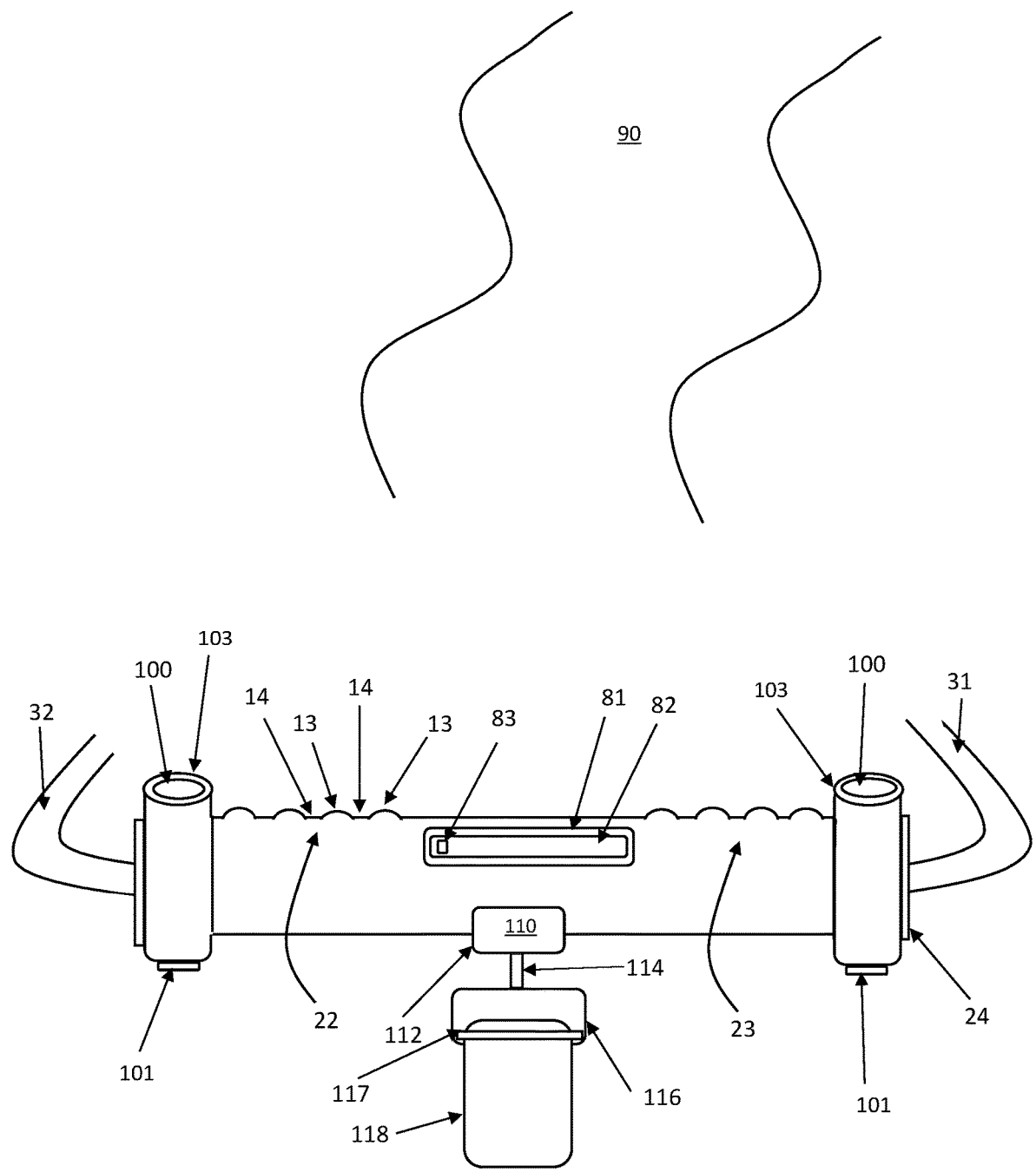
FIG. 4A is top plan view of another embodiment and depicts additional features.

As shown in FIG. 4A, the embodiment in FIGS. 1A-3B may include additional features such as holder for animal waste bags 87, lights 100 and cell phone holder 110. These features may be incorporated into the different embodiments of the handle body 20 discussed above. For illustration purposes, the features are shown incorporated into the handle body of FIG. 3A.

Figure 4B:
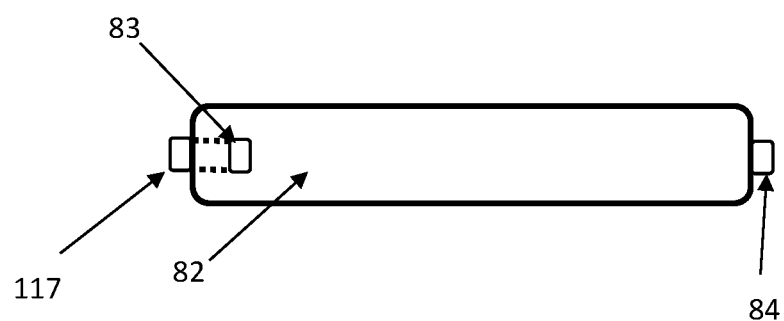
FIG. 4B is a top plan view of the opening and lid shown in FIG. 4A.
Figure 4C:
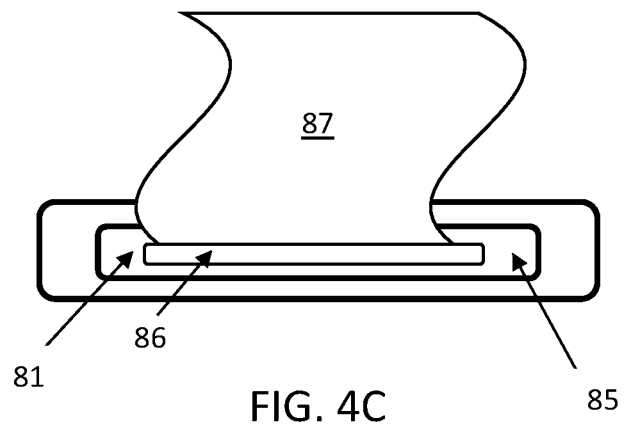
FIG. 4C is a top view of bags situated in the opening of FIG. 4B.

The holder for animal waste bags 87 has an opening 81 formed in the handle body 20 with a releasable cover or lid 82 and a release button 83. As shown in FIG. 4B, the lid 82 may be released by moving the button 83 towards the opposite side or bevel extension 84. The button 83 is connected to latch 117. As a result, when the button is moved sufficiently towards the bevel extension 84, latch 117 may move enough to release the lid 82 on one side. The user then may pull the lid 82 out of the opening 81. Alternatively, the bevel extension 84 may be a hinge 84 which would allow the lid 82 to rotate and remain attached to the handle body 20.

With either a hinge or bevel extension 84, removing the lid 82 reveals opening 81 which may have a slot cover 85 from which bags 87 may be pulled. The bags 87 are supplied in the form of a roll 86 inserted into the opening 81 in the handle body 20. The bags 87 may be pulled through the slot cover 85 and used as needed.

The cell phone holder 110 has base 112, swivel section 114 and holder 116 with a retaining latch 117. A cell phone 118 may be inserted into holder 116 and secured with latch 117. The swivel section 114 allows base 112 to remain fixed on the handle body 20 and the holder 116 to rotate relative to the base 112 and handle body 20. The user may rotate the cell phone as needed. The base 112 is attached to the handle body 20 by a suitable method such as fixed connection between the base 112 and the handle body 20. The fixed connection may be formed by bolting, screwing or using a suitable adhesive, etc. Alternatively, base 112 may be a clamp 112 that allows the cell phone holder 110 to be removably positioned on the handle body 20.

In the preferred embodiment, light devices 100 may be positioned on either side of the handle body 20. Alternatively, a single light device 100 may be used and the position of the light or lights may be between grips 22, 23. FIG. 4A is a view from directly above handle body 20. As shown, light devices 100 are added to the upper surface of handle body 20. Also, it is preferred that light devices 100 are positioned so they are focused on the path 90 in front of the user or directed towards the clasp 40. There is a battery access 101 opposite the light openings 103. If light devices 100 are desired in the handle body 20, then the openings 103 may be formed during the handle body 20 molding process or light devices 100 may be attached to handle body 20 with a suitable method such as adhesives, screws and nuts, rivets, hook and loop fastener, etc. It is preferably that some form of LED lights are inserted in openings 103 and powered by batteries inserted in battery access 101.

Figure 5:
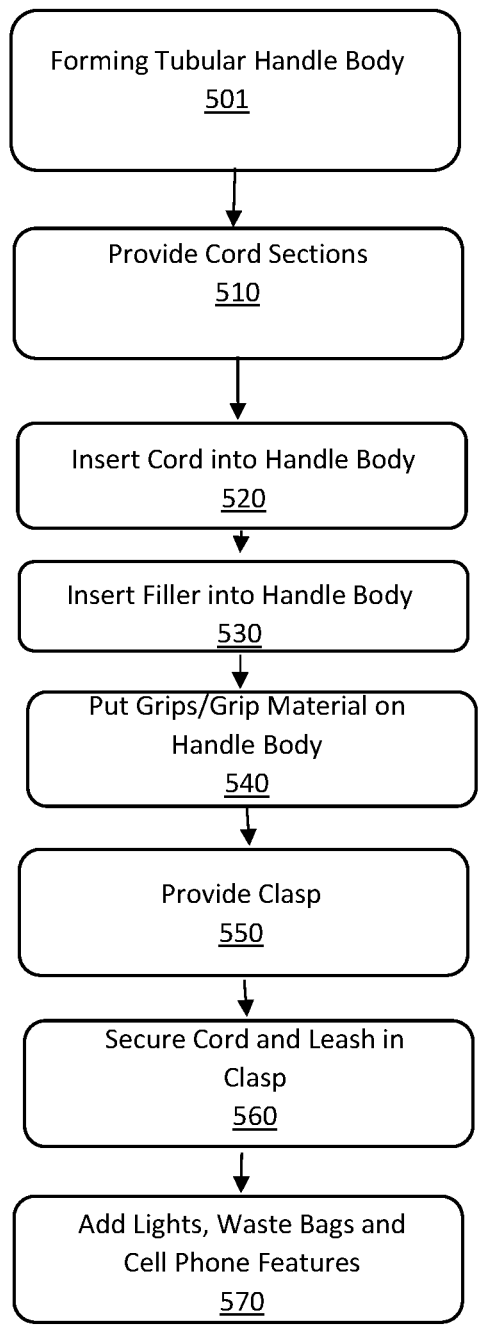
FIG. 5 is a process diagram of a method of producing the multi-grip leash handle.

FIG. 5 is a flow diagram of the preferred method or embodiment of making the handle system 10. In step 501, the desired handle body 20 is provided by a suitable method such as molding, injection molding, casting or 3-dimensional printing. The handle body may be formed of a material that is strong enough to resist the animal or animals to be attached to the handle system 10. Examples of suitable material may be hard or strong plastic, rubber, metals or metal alloys.

In step 501, it is also important to decide which handle body is desired. In other words, will the handle body 20 have the grip formed into the handle as in FIG. 3A or will be the handle body 20 be a substantially hollow cylindrical form as in FIG. 1. If the handle body 20 of FIG. 1 is chosen, then it may be provided by the processes mentioned above or by other methods such as cutting a portion of plastic, PVC or metal pipe.

Another factor which should be considered at this point is whether or not the light feature 100 will be desired on the handle body 20. Since the lights 100 are added to the ends of the handle body 20, the handle body 20 is extended an additional length to accommodate the lights 100. For example, the handle body may increase about half an inch on each end to accommodate the lights 100. Thus, the handle body 20 may be increased from the preferred length of 11 inches without lights 100 to about 12 inches with lights 100.

Next, in Step 510, the appropriate lengths of cord 30 are provided. If one length of cord 30 is desired, then a length of cord 30 should be provided that is long enough to be threaded through the handle body 20 with two substantially equal sections of cord 31, 32 that can extend from the handle body 20 and be clamped together to form a triangle with the handle body as the base. Alternatively, if the form of the handle body 20 in FIG. 1D is desired, then two sections of cord 31 and 32 may be provided such that each section of cord 31 and 32 is long enough to be knotted or clamped 36 inside the central bore 28 of the respective side of the handle body 20. The use of two sections of cord 31 and 32 would allow the middle of the handle body 20 to remain free of the cord 30 so opening 81 may be created and waste bags 87 may be inserted.

In Step 520, the cord 30 is inserted into the desired handle body 20. This may be performed using two different methods depending on whether one or two lengths of cord 30 are utilized. To make the embodiment shown in FIG. 1A, cord 30 is threaded through a first opening 16 the first end 3 of handle body 20. The cord 30 is then pulled out the second opening in the second end 7 of the handle body 20, Next, cord 30 is adjusted so sections 31 and 32 are equal in length or substantially equal in length.

If two lengths of cord 31 and 32 are used, assembly may proceed as follows. An end of the cord 31 is threaded through opening 16 in one end 3 of the handle body 20 and a knot or clamp 36 is formed in the end of cord 32 that is located in the central bore 28. The same is done for the other length of cord 32.

In Step 540, the grips 22, 23 are placed on the handle body. The first grip 22 and second grip 23 are pulled on the handle body 20. The grips may be permanently attached to the handle body 20 with a glue, adhesive or epoxy, etc. Also, the grips may be removably attached with a friction fit.

Alternatively, a grip material, such as rubber, plastic or another polymer, may be applied to the entire handle body 20 or portions by spraying, brushing If the handle body 20 that is provided in Step 501 is similar to the embodiment of FIG. 3A and has the grips 22, 23 molded into surface 21, then step 530 may entail coating the entire handle body surface 21 or a portion thereof with a grip layer 38. Initially, the handle body surface 21 may be texturized to assist the grip layer 38 with adhering to the handle body surface 21. Next, the handle body surface 21 may be dipped, sprayed and/or painted with an appropriate grip material to create the grip layer 38. An example of an appropriate material would be a liquid synthetic or natural rubber, acrylic or plastic material that can be sprayed or dipped on. Additionally, the grip layer 38 may be texturized to assist with gripping.

Next, in Step 540, the cord 30 is secured in the handle body. Filler 4 is inserted into openings 16 on either end 3, 7 of the handle body 20. Enough filler 4 is inserted to insure the sections of cord 33 or 31 and 32 are held substantially in the center of the handle body 20 by the filler 4 once it is dry. The filler 4 prevents cord 30 from moving within the handle body 20 and prevents the cord 30 from contacting, tearing or breaking through openings 16 when the leashed animal places a load on the handle system 10. In the preferred embodiment, the filler 4 is a polyurethane expansion glue, but similar materials, such as foam, spray foam and other types of materials with sufficient strength to secure the cords 31, 32 and 33 may be used.

Figure 4D:
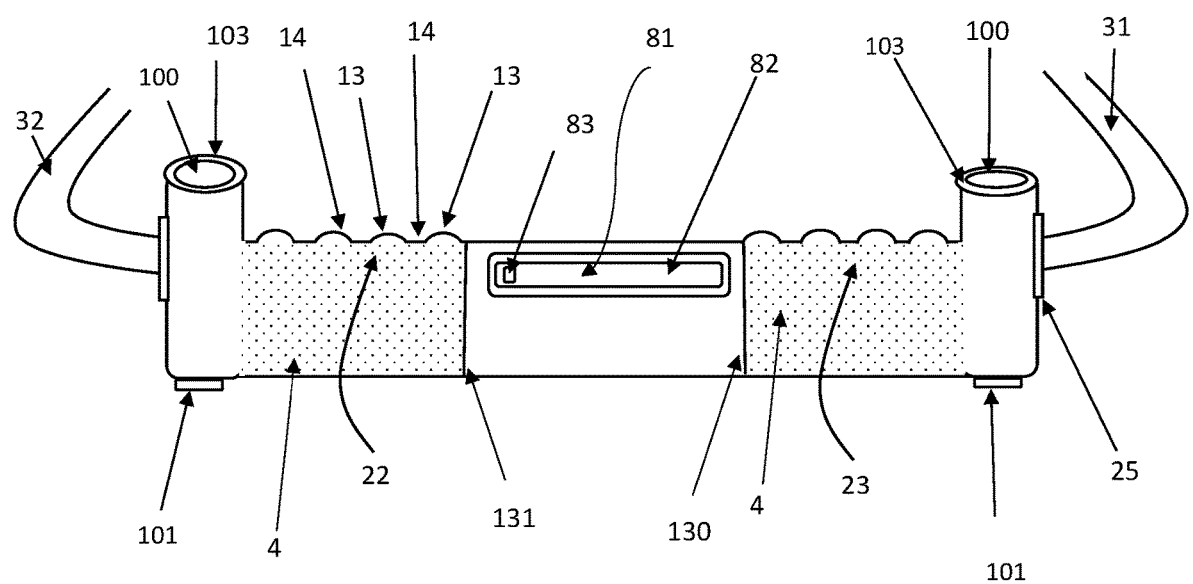
FIG. 4D is top view of the handle body with waste bag opening and shows inner portions of handle body.

It is noted that adjustments may need to be made in Step 540, if the waste bag opening 81 is desired. As shown in FIG. 4D, barriers 130 and 131 may be placed inside the handle body 20 before the filler 4 is injected into the openings 16. The barriers 130, 131 will ensure the filler 4 does not fill the entire handle body 20 and a space remains open for creating the waste bag 87 feature.

In Step 550, an appropriate clasp 40 is provided. The clasp should be of sufficient size and strength such that it can provide stability of the handle system 10. In the preferred embodiment, the clasp is made of a thermoplastic and has two screws 44. When the screws are removed, the inside of the clasp 40 has teeth for securing items such as cord 31, 32 and 35. Using clasp 40 is the preferred method of securing sections of cord 31, 32 and 35. However, clasps made of different materials such as a metal or metal alloys may also be selected. Also, the cord 31 and 32 may be spliced together rather than using a clasp.

In Step 560, both ends of cord 31 and 32, as well as cord 35 are secured in clasp 40. This is done by removing screws 44 from the clasp 40 and opening the clasp 40. Next, the cord 31, 32 and leash 35 are placed in the clasp 40 so that cords 31 and 32 are substantially equal in length. Also, cords 31, 32 are placed in a first end of the clasp 40 and cord 35 is placed in a second of the clasp 40 which is opposite the first end. Cord 35 also extends in a direction opposite or away from cords 31, 32. Finally, the clasp 40 is closed and screws 44 are rotated and tightened so that clasp 40 may securely hold cords 31, 32 and 35.

In Step 570, the additional features desired in the handle body 20 are addressed. If light devices 100 are desired and the light devices were not made during the formation or molding process, then the lights 100 added to the handle body 20 with an adhesive, screws and or rivets, etc. Also, if the waste bag 87 is desired, then the opening 81 is cut into the handle body 20 if it was not created in the handle body 20 during the molding process. A roll 86 of waste bags 87 is inserted into opening 81. The opening 81 may be fitted with a slot cover 85 and solid cover 82. Both the slot cover 85 and solid cover 82 may be formed via an injection molding process or other molding or 3-dimensional printing process, etc. The slot cover 85 and solid cover 82 may be made of plastic, metal, metal alloy, etc.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A handle apparatus for an animal leash or harness, the handle apparatus comprising:
    a tubular-handle body including a first body end with a first opening and a second body end with a second opening, a substantially annular handle body surface extending between the first body end and second body end, and a central bore extending between the first and second openings and defined by the handle body surface;
    a first cord including a first portion and third portion, the first portion extending from the first opening in first end of the handle body, and the third portion extending from the first opening into the central bore, the third portion extending towards the second opening in the handle body;
    a second cord including a second portion and a fourth portion, the second portion extending from the second opening in the second end of the handle body, the fourth portion extending from the second opening into the central bore, the fourth portion extending towards the first opening in the handle body;
    a clasp connecting the first portion of the first cord and the second portion of the second cord;
    a third cord including a first cord end connected to the clasp, the third cord including a second cord end extending away from the clasp;
    a connector attached to the second cord end of the third cord, the connector configured to connect to at least one animal leash, animal collar or animal harness;
    a first grip section on the handle body surface, the first grip section adjacent the first end of the handle body; and
    a second grip section on the handle body surface, the second grip section adjacent the second end of the handle body and the second grip section laterally adjacent and coaxial to the first grip section; and
    an elongated opening in the handle body surface, the elongated opening disposed coaxially between the first grip section and the second grip section such that the elongated opening extends into the handle body transverse to a longitudinal direction of the handle body, and the elongated opening providing access to a portion of the central bore directly under the elongated opening.

2. The handle apparatus as recited in claim 1, wherein the first cord further comprises a third portion extending from the first opening into the central bore, the third portion extending towards the second opening in the handle body, the second cord further comprises a fourth portion extending from the second opening into the central bore, the fourth portion extending towards the first opening in the handle body, and
    the handle body further comprises a filler within the central bore, the filler surrounding both the third portion of the first cord and the fourth portion of the second cord such that the filler prevents the first cord from contacting the handle body at the first opening and the filler prevents the second cord from contacting the handle body at the second opening.

3. The handle apparatus of claim 2, wherein the filler comprises a polyurethane expansion glue.

4. The handle apparatus of claim 2 wherein the filler comprises one of an expansion glue, polyurethane glue, foam, or spray foam.

5. The handle apparatus as recited in claim 1, wherein the first portion of the first cord includes a first length of cord extending from the first opening to the clasp, the second portion of the second cord includes a second length of cord extending from the second opening to the clasp, and
    the first length of cord is substantially equivalent to the second length of cord.

6. The handle apparatus as recited in claim 1, further comprising:
    a third grip section on the handle body surface, the third grip section located laterally adjacent to and between the first and second grip sections.

7. The handle apparatus as recited in claim 1, wherein the handle body is formed of a substantially non-flexible material.

8. The handle apparatus as recited in claim 1, wherein the handle body comprises one of a metal, plastic, polymer, wood or ceramic.

9. The handle apparatus as recited in claim 1, wherein the first grip section and the second grip section each include at least one ridge and one groove formed in the handle body surface.

10. The handle apparatus as recited in claim 1, further comprising:
    a first grip overlying the first grip section of the handle body surface; and
    a second grip overlying the second grip section of the handle body surface, wherein the first and second grips are each configured to accommodate a users' hand.

11. The handle apparatus as recited in claim 1, further comprising:
    at least one light device connected to the handle body such that the at least one light device contacts the handle body surface and the at least one light device is configured to illuminate an area in front of the handle body and in a direction of an animal connected to the handle body.

12. The handle apparatus as recited in claim 1, further comprising:
    the elongated opening configured to hold at least one bag in the central bore within the elongated opening.

13. The handle apparatus as recited in claim 1, wherein the elongated opening is configured to hold an item within the central bore.

14. The handle apparatus as recited in claim 1, wherein the elongated opening is configured to dispense an item from within the central bore.

15. The handle apparatus as recited in claim 1, further comprising a cover connected to the handle body, the cover extending over the elongated opening.

16. A handle apparatus for an animal leash or harness, the handle apparatus comprising:
- a tubular handle body including a first body end with a first opening and a second body end with a second opening, a substantially annular handle body surface extending between the first body end and second body end, and a central bore extending between the first and second openings and defined by the handle body surface;
- a first cord connected to the handle body within the central bore, the first cord extending outwardly from the first opening in first body end of the handle body;
- a second cord connected to the handle body within the central bore, the second cord extending outwardly from the second opening second body end of the handle body;
- the first and second cords connected to at least one animal leash, animal collar or animal harness;
- a first grip section on the handle body surface, the first grip section adjacent the first end of the handle body; and
- a second grip section on the handle body surface, the second grip section adjacent the second end of the handle body and the second grip section laterally adjacent and coaxial to the first grip section; and
- an elongated opening in the handle body surface, the elongated opening disposed coaxially between the first grip section and the second grip section such that the elongated opening extends into the handle body transverse to a longitudinal direction of the handle body, and the elongated opening providing access to a portion of the central bore directly under the elongated opening.

* * * * *